United States Patent [19]

Feeman

[11] 4,166,059
[45] Aug. 28, 1979

[54] ALKALI-FAST DISAZO DISULFIMIDE DYES

[75] Inventor: James F. Feeman, Wyomissing, Pa.

[73] Assignee: Crompton & Knowles Corporation, Worcester, Mass.

[21] Appl. No.: 130,850

[22] Filed: Apr. 2, 1971

[51] Int. Cl.$^2$ .................. C09B 31/06; C09B 33/08; C09B 33/10; D06P 3/24
[52] U.S. Cl. .................. 260/186; 260/191; 260/196; 260/205; 260/556 SN
[58] Field of Search .................. 260/186, 191

[56] References Cited

U.S. PATENT DOCUMENTS

| | | | |
|---|---|---|---|
| 2,295,050 | 9/1942 | Reynolds et al. | 260/160 |
| 2,518,078 | 8/1950 | Schmid et al. | 260/162 |
| 2,773,863 | 12/1956 | Bolliger | 260/162 |
| 2,909,516 | 10/1959 | Jung | 260/196 |
| 2,922,690 | 1/1960 | Mueller et al. | 260/158 X |
| 3,134,761 | 5/1964 | Ackermann et al. | 260/160 X |
| 3,134,766 | 5/1964 | Merian et al. | 260/186 |
| 3,150,123 | 9/1964 | Enders et al. | 260/198 |
| 3,310,550 | 3/1967 | Liechti | 260/152 |
| 3,485,814 | 12/1969 | Speck | 260/186 |

FOREIGN PATENT DOCUMENTS

| | | |
|---|---|---|
| 1115384 | 10/1961 | Fed. Rep. of Germany ........... 260/149 |
| 1925288 | 11/1970 | Fed. Rep. of Germany . |
| 1264071 | 2/1972 | United Kingdom . |

OTHER PUBLICATIONS

Kirk–Othmer, Encyclopedia of Chemical Technology, vol. 7, 1966, pp. 469, 487 and 490–492.
Kirk–Othmer, Encyclopedia of Chemical Technology, vol. 2, 1964, pp. 869–874.
Chemical Abstracts, vol. 74, 1971, 88661c (Sommer, et al.), an abstract of the Sommer, et al. German patent.

*Primary Examiner*—Floyd D. Higel
*Attorney, Agent, or Firm*—William H. Elliott, Jr.

[57] ABSTRACT

Alkali-fast yellow to scarlet disazo water-soluble dyes for natural and synthetic polyamide fibers having the structure:

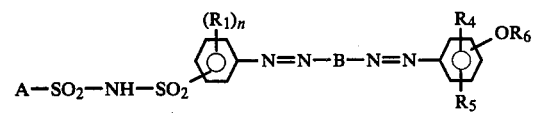

wherein n is 1 or 2; A represents an alkyl radical or an aromatic radical such as phenyl, tolyl, naphthyl, or halophenyl; $R_1$ represents H, halogen, —O— lower alkyl or alkyl; B represents phenyl, substituted phenyl or naphthyl; $R_4$ represents H, lower alkyl having —O— lower alkyl or halogen; $R_5$ represents H, lower alkyl or —O— lower alkyl, and $R_6$ represents methyl or ethyl.

20 Claims, No Drawings

ALKALI-FAST DISAZO DISULFIMIDE DYES

This invention concerns new and valuable yellow to scarlet disazo water-soluble dyes for natural and synthetic polyamide fibers having the structure:

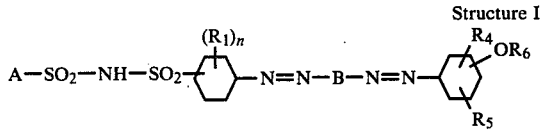

Structure I wherein (and throughout the specification):
n is 1 or 2
A represents an alkyl radical having from 1 to 4 carbon atoms, or an aromatic radical such as phenyl, tolyl, naphthyl, or halophenyl;
$R_1$ represents H, halogen, —O-lower alkyl having from 1 to 4 carbon atoms or alkyl having from 1 to 4 carbon atoms;
B represents

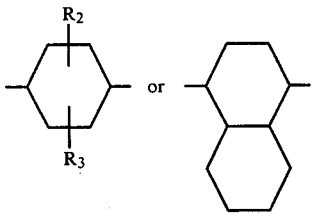

$R_2$ represents H, lower alkyl having from 1 to 4 carbon atoms or —O-lower alkyl having from 1 to 4 carbon atoms;
$R_3$ represents H, lower alkyl having from 1 to 4 carbon atoms or —O-lower alkyl having from 1 to 4 carbon atoms;
$R_4$ represents H, lower alkyl having from 1 to 4 carbon atoms, —O-lower alkyl having from 1 to 4 carbon atoms, —Br, —F or —Cl;
$R_5$ represents H, lower alkyl having from 1 to 4 carbon atoms, or —O-lower alkyl having from 1 to 4 carbon atoms; and
$R_6$ represents —CH$_3$ or —CH$_2$CH$_3$ The disulfimide group which confers water-solubility on the compound may be located ortho, meta or para to the first azo group and the alkoxy group, —OR$_6$, may be located ortho or para to the second azo group.

The compounds of this invention may be prepared by the following method which constitutes another aspect of this invention and involves diazotizing an amino phenyl disulfimide having the generic structure:

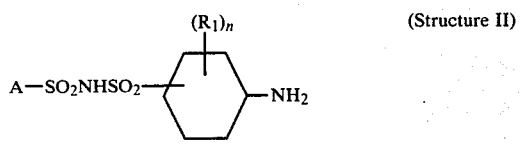

(Structure II)

coupling the diazonium salt with an aromatic amine having the generic structure:

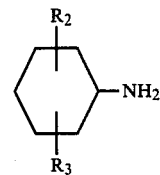

(Structure III)

or with 1-naphthylamine; rediazotizing the aminomonoazo intermediate thus generated and having the structure

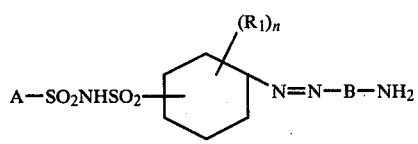

(Structure IV)

and coupling the diazonium salt with a phenol having the generic structure:

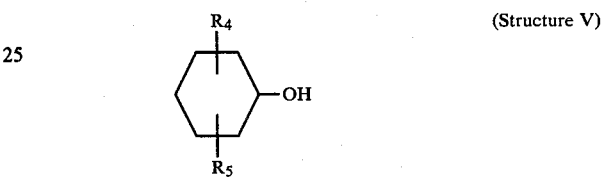

(Structure V)

The disazo compound thus formed is then alkylated by treatment with an alkyl halide or dialkyl sulfate to convert the hydroxyl group to an alkoxyl group and thus produce the desired Structure I compound.

Suitable Structure II aminophenyldisulfimides include, for example:
3-amino-5-chloro-6-methylphenyl phenyl disulfimide, 3-aminophenyl methyl disulfimide, 3-aminophenyl butyl disulfimides, 3-aminophenyl ethyl disulfimide, 3-aminophenyl phenyl disulfimide, 3-aminophenyl propyl disulfimides, 3-aminophenyl tolyl disulfimides, 3-aminophenyl chlorophenyl disulfimides, 3-aminophenyl bromophenyl disulfimides, 3-aminophenyl naphthyl disulfimides, 3-amino-4-chlorophenyl tolyl disulfimides, 3-amino-4-chlorophenyl methyl disulfimide, 3-amino-4-chlorophenyl naphthyl disulfimides, 3-amino-4-methoxyphenyl tolyl disulfimides, 3-amino-4-methyl phenyl disulfimide, 4-aminophenyl methyl disulfimide, 4-aminophenyl ethyl disulfimide, 4-aminophenyl propyl disulfimides, 4-aminophenyl butyl disulfimides, 4-aminophenyl phenyl disulfimide, 4-aminophenyl tolyl disulfimides, 4-aminophenyl chlorophenyl disulfimides, 4-aminophenyl naphthyl disulfimides, 4-amino-3-chlorophenyl phenyl disulfimide, 4-amino-3-chlorophenyl methyl disulfimide, 4-amino-5-methylphenyl tolyl disulfimides, 2-aminophenyl tolyl disulfimides, 2-aminophenyl methyl disulfimides, 2-aminophenyl phenyl disulfimide, 3-amino-6-methoxyphenyl phenyl disulfimide, etc.

The diazotization of Structure II amines may be accomplished by usual known methods, for example in aqueous solution using mineral acids and sodium nitrite, preferably adding an alkaline aqueous solution of the amine and an equivalent amount of sodium nitrite to cold dilute mineral acid.

Suitable amines having Structure III include, for example, aniline, o-toluidine, m-toluidine, o-anisidine, m-anisidine, cresidine, 2,5-dimethoxyaniline, o-phenetidine, m-phenetidine, 2,6-dimethylaniline, 2,3-dimethylaniline, 2,5-dimethylaniline, o-isopropylaniline, o-ethylaniline, 2,5-diethylaniline, 3-amino-4-ethoxytoluene, etc. The aromatic amine must be unsubstituted in the para position to the amino group.

Coupling of the diazonium salt derived from the aminophenyldisulfimide of Structure II with the aromatic amine of Structure III may be carried out by well known procedures, for example in weakly acidic aqueous solution.

When desirable to increase its rate of coupling, the Structure III amine may be converted to its N-methane sulfonic acid derivative by reaction with formaldehyde-sodium bisulfite adduct ($HOCH_2SO_3Na$) prior to coupling. This allows the coupling to be carried out at weakly acidic to neutral pH. Following coupling the methane sulfonic acid grouping may then be readily removed by heating with dilute alkali hydroxide solution to regenerate the desired intermediate having Structure IV according to the following reaction:

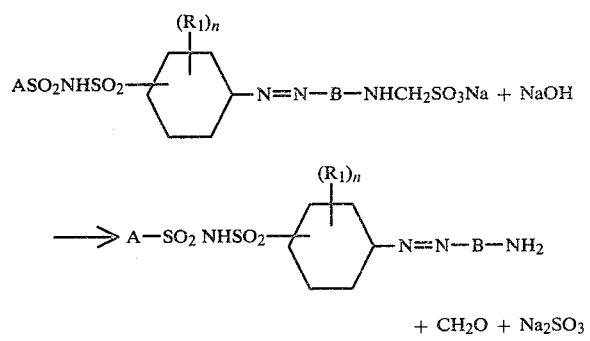

The coupling product (Structure IV) may be isolated if desired.

Rediazotization of the aminomonoazo compound (Structure IV) may be effected at 0°–50° C. in aqueous acidic solution or, alternatively, in concentrated $H_2SO_4$ or $H_3PO_4$ with nitrosylsulfuric acid.

Suitable final coupling component phenols having Structure V include, for example, phenol, o-cresol, m-cresol, p-cresol, 2-methoxyphenol, 2-ethoxyphenol, 3-methoxyphenol, 2-chlorophenol, 6-chloro-o-cresol, 3-chloro-2-methylphenol, 2-chloro-5-methylphenol, 2-ethylphenol, 2-isopropylphenol, 2,6-diethylphenol, 3,5-dimethylphenol, o-t-butylphenol, 2,6-dimethylphenol, 2,3-dimethylphenol, etc.

The final coupling is preferably carried out in neutral to weakly alkaline aqueous solution. The product may either be isolated by filtration and then alkylated, or the final coupling solution used directly in the alkylation reaction at alkaline pH values.

Suitable alkylation agents include, for example, methyl chloride, ethyl chloride, methyl bromide, ethyl bromide, methyl iodide, ethyl iodide, and especially dimethyl sulfate and diethyl sulfate.

The product dye, Structure I, generally crystallizes from solution and may be isolated from the reaction mixture by filtration (after salting if necessary). The compounds produced are water-soluble solids which dye nylon and other synthetic polyamide fibers as well as natural polyamides such as silk and wool from neutral, weakly acidic or weakly alkaline aqueous baths in desirable yellow, orange, or scarlet shades having excellent fastness to light, good fastness to wet treatments such as washing, and excellent resistance to shade change when spotted with or immersed in alkaline solutions.

Dyes having Structure I vary considerably in their water solubility and dyeing properties, many of them having valuable combinations of these properties with those previously stated. Those dyes having lower molecular weight A groups in combination with minimal substitution of the remainder of the molecule generally tend to have higher solubility while those having higher molecular weight A groups (especially phenyl, tolyl, naphthyl and halophenyl groups) together with more and higher molecular weight substituents elsewhere in the molecular structure have adequate, but generally lower, solubility and generally exhaust more completely from neutral to alkaline dyebaths onto polyamide fibers.

The Structure I compounds wherein $R_2$ and $R_3$ are H or lower alkyl are generally yellow to reddish yellow in hue; those wherein $R_2$ is O-lower alkyl, while $R_3$ is H or lower alkyl, are generally reddish-yellow to orange in hue; those wherein $R_2$ and $R_3$ are each O-lower alkyl are generally reddish-orange to scarlet in hue when dyed on nylon or other polyamide fibers; and those in which B is 1,4-naphthylene are orange in hue.

Thus still other aspects of this invention are concerned with the dyeing of polyamide fibers with Structure I compounds and the dyeings so produced.

In the following examples, unless otherwise indicated, parts are by weight, percentages are by weight and temperatures are expressed in degrees Centigrade.

EXAMPLE 1

A solution of 32.6 parts of 3-aminophenyl p-tolyl disulfimide as the sodium salt and 7 parts of sodium nitrite in 200 parts of water was poured with good stirring into a mixture of 29 parts of 32% hydrochloric acid and sufficient ice to keep the temperature at 0°–5° during the addition. After stirring 15 minutes, a slight excess of nitrous acid was removed by addition of sulfamic acid. Then a solution of 15.3 parts of 2,5-dimethoxy-aniline in 100 parts of water and 13 parts of 32% hydrochloric acid was added. After stirring a few minutes the pH was slowly raised to 2.5 by dropwise addition of 10% sodium hydroxide solution. Stirring was continued and after about 2 hours coupling was complete. The pH of the coupling was raised to 11.5 by addition of 50% sodium hydroxide solution, giving complete solution. Addition of 32% hydrochloric acid to pH 1 gave a precipitate which was filtered and washed once with water.

The paste was redissolved in 400 parts of water with 10 parts of 50% sodium hydroxide and 7 parts of sodium nitrite was added as aqueous solution. The resultant solution was poured into a mixture of 35 parts of 32% hydrochloric acid and water and the mixture warmed to 50° to effect diazotization. After stirring 1 hour the precipitate of diazonium salt was filtered and added to a solution of 9.4 parts of phenol, 5 parts of sodium hydroxide and 15 parts of sodium carbonate in 500 parts of water. Coupling was rapid. After one hour the reaction mixture was heated to 80° C. The pH was raised to 13 with sodium hydroxide solution and maintained there for one hour during which 100 parts of diethyl sulfate was added. The resultant product crystallized out, was filtered, washed once with a small amount of water and dried. It is a dark-colored water-soluble solid which dyes nylon, silk and wool from weakly acid, neutral, and especially alkaline baths in bright, level scarlet shades which have excellent fastness to light and to washing and are not changed in shade when spotted with, or immersed in, alkaline solutions such as dilute alkali hydroxide or aqueous ammonia. The dye has the structure:

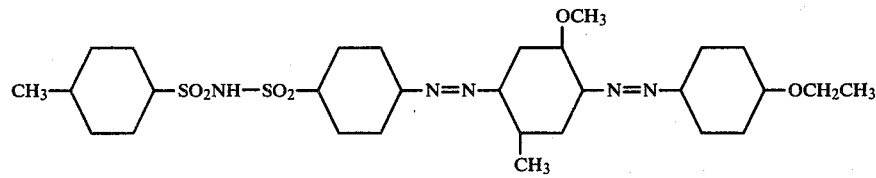

light and washing and are not changed in shade when spotted with or immersed in alkaline solutions such as dilute alkali hydroxide or aqueous ammonia. The dye has the structure:

EXAMPLE 3

EXAMPLE 2

To a solution of 32.6 parts of 4-aminophenyl p-tolyl disulfimide and 4 parts of sodium hydroxide in 400 parts of water was added a concentrated solution of 7 parts of sodium nitrite. This solution was poured into 35 parts of 32% hydrochloric acid at 20°–30° C. After 30 minutes stirring a slight excess of nitrous acid was removed by addition of sulfamic acid. The diazonium salt slurry was cooled to 0° by addition of ice and a solution of 13.7 parts of cresidine in 50 parts of water and 15 parts of 32% hydrochloric acid was added. The pH of the coupling mixture was adjusted to 3.5 and maintained there for 8 hours, when coupling was complete. The ph was then lowered to 1 with hydrochloric acid and the product filtered. The paste was reslurried in 400 parts of water with 4 parts of sodium hydroxide at 85° and treated with 7 parts of sodium nitrite. The gelatinous slurry was poured into 35 parts of 32% hydrochloric acid and 100 parts of water at 50°. After two hours stirring the crystalline diazonium salt was filtered and reslurried in 300 parts of water. To this was added a solution of 9.4 parts phenol and 4 parts sodium hydroxide in 50 parts of water, and 5 parts of sodium carbonate was sifted in.

When coupling was complete the pH was raised to 11 and the solution filtered to remove a small amount of insoluble matter. The filtrate was treated with 20 parts of sodium bicarbonate, and the resultant precipitate filtered. The resultant paste was redissolved in 400 parts of water and ethylated by addition gradually during about one hour of 100 parts of diethyl sulfate, with simultaneous addition of 50% sodium hydroxide solution to maintain the reaction at pH about 11 and temperature 80°–90°. The reaction was heated 30 minutes longer at 80° and the crystalline precipitate then filtered and dried. The product is a brown solid which dyes nylon, silk and wool in bright orange shades from weakly acidic, neutral, and, especially, weakly alkaline aqueous baths. The dyeings have excellent fastness to Diazonium salt slurry (prepared by indirect diazotization of 32.6 parts of 3-aminophenyl p-tolyl disulfimide as described in Example 1 was added to 100 parts of a neutral aqueous solution containing 21 parts of sodium anilinomethane sulfonate (prepared by reaction of 37% formaldehyde with an equimolar amount of sodium bisulfite and then reaction of the resultant condensation product with an equimolar amount of aniline according to well-known procedures) and 15 parts of sodium acetate at 5°–10°. After stirring 1 hour coupling was complete. The solution was heated to 85° and 3% (based on volume of coupling) of solid sodium hydroxide was added. Heating at about 90° for 2 hours resulted in complete hydrolysis, giving product having the structure:

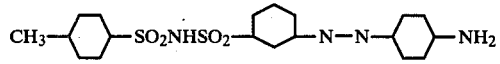

which crystallized out on cooling and was filtered. This amino monoazo compound (43 parts) was diazotized indirectly according to the procedure given in Example 2 but at 15°–20° C. The diazonium salt precipitate was filtered, reslurried in 500 parts of water and coupled with O-cresol by adding to it a solution of 10.8 parts of O-cresol and 4 parts of sodium hydroxide in 25 parts of water and then adding 5 parts of sodium carbonate. The product precipitated and was filtered. The paste was redissolved in 600 parts of water at 80° and the pH raised to above 11 with 50% sodium hydroxide solution and kept there during the addition at 80°–83° of 90 parts of diethyl sulfate. After an additional 15 minutes at 85° the precipitate was filtered and dried. It is a water-soluble solid which dyes nylon, silk and wool in reddish-yellow shades from weakly acidic, neutral, and weakly alkaline aqueous baths. The dyeings on nylon have excellent fastness to light and to washing. It has the structure:

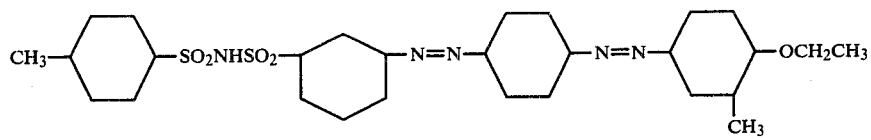

The new dyes, having Structure I, are normally isolated as their sodium salts, but may also be obtained as their potassium or lithium salts if desired, or as the free acids. The latter may be converted readily to their ammonium salts by treatment with aqueous ammonia.

In the following table are listed components which were used to make additional dyes having Structure I. These examples were made using analogous procedures to those described in Examples 1–3. The dyes produced dye polyamide fibers in light and wash fast shades having the hues listed in the table.

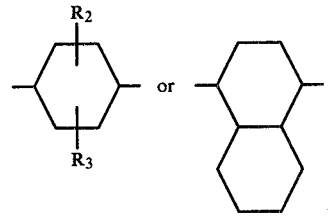

| Example Number | First Component | Second Component | End Component | Alkylating Agent used | Hue on Nylon |
|---|---|---|---|---|---|
| 4. | 4-Aminophenyl 4'tolyl disulfimide | 2,5-Dimethoxyaniline | Phenol | Diethyl Sulfate | Scarlet |
| 5. | 3-Aminophenyl methyl disulfimide | Cresidine | Phenol | Diethyl Sulfate | Orange |
| 6. | 3-Aminophenyl methyl disulfimide | 2,5-Dimethoxyaniline | Phenol | Diethyl Sulfate | Scarlet |
| 7. | 3-Aminophenyl methyl disulfimide | 1-Naphthylamine | Phenol | Diethyl Sulfate | Orange |
| 8. | 4-Aminophenyl methyl disulfimide | Cresidine | Phenol | Diethyl sulfate | Orange |
| 9. | 4-Aminophenyl methyl disulfimide | 2,5-Dimethoxyaniline | Phenol | Diethyl Sulfate | Scarlet |
| 10. | 4-Aminophenyl methyl disulfimide | Cresidine | o-Cresol | Diethyl Sulfate | Orange |
| 11. | 4-Aminophenyl methyl disulfimide | Cresidine | m-Cresol | Diethyl Sulfate | Orange |
| 12. | 4-Aminophenyl methyl disulfimide | Cresidine | p-Cresol | Diethyl Sulfate | Orange |
| 13. | 4-Aminophenyl 4'-tolyl disulfimide | 2,5-Dimethoxyaniline | O-Cresol | Diethyl Sulfate | Scarlet |
| 14. | 4-Aminophenyl 4'-tolyl disulfimide | 2,5-Dimethoxyaniline | 3,5-Dimethylphenol | Diethyl Sulfate | Scarlet |
| 15. | 3-Aminophenyl 4'-tolyl disulfimide | Aniline | Phenol | Diethyl Sulfate | Reddish-Yellow |
| 16. | 3-Aminophenyl 4'-tolyl disulfimide | Aniline | Phenol | Dimethyl Sulfate | Reddish-Yellow |
| 17. | 3-Aminophenyl 4'-tolyl disulfimide | Aniline | o-Cresol | Dimethyl Sulfate | Reddish-Yellow |
| 18. | 3-Aminophenyl 4'-tolyl disulfimide | o-Anisidine | Phenpl | Diethyl sulfate | Yellowish-Orange |
| 19. | 3-Aminophenyl 4'-tolyl disulfimide | o-Anisidine | o-Cresol | Diethyl Sulfate | Yellowish-Orange |
| 20. | 3-Aminophenyl 4'-tolyl disulfimide | o-Anisidine | m-Cresol | Diethyl Sulfate | Yellowish-Orange |
| 21. | 3-Aminophenyl 4'-tolyl disulfimide | o-Anisidine | p-Cresol | Diethyl Sulfate | Yellowish-Orange |
| 22. | 3-Aminophenyl methyl disulfimide | m-Toluidine | Phenol | Diethyl sulfate | Reddish-Yellow |
| 23. | 3-Aminophenyl n-propyl disulfimide | 2,5- Dimethoxyaniline | Phenol | Diethyl sulfate | Scarlet |
| 24. | 3-Aminophenyl n-butyl disulfimide | 2,5-Dimethoxyaniline | Phenol | Diethyl Sulfate | Scarlet |
| 25. | 3-Aminophenyl ethyl disulfimide | 2,5-Dimethoxyaniline | Phenol | Diethyl Sulfate | Scarlet |
| 26. | 4-Aminophenyl n-butyl disulfimide | 2,5-Dimethoxyaniline | Phenol | Diethyl Sulfate | Scarlet |
| 27. | 4-Aminophenyl ethyl disulfimide | 2,5-Dimethoxyaniline | Phenol | Diethyl Sulfate | Scarlet |
| 28. | 4-Aminophenyl n-propyl disulfimide | 2,5-Dimethoxyvaniline | Phenol | Diethyl sulfate | Scarlet |
| 29. | 4-Aminophenyl phenyl disulfimide | 2,5-Dimethoxyaniline | Phenol | Diethyl sulfate | Scarlet |
| 30. | 3-Aminophenyl 2'-naphthyl disulfimide | 2,5-Dimethoxyaniline | Phenol | Diethyl Sulfate | Scarlet |
| 31. | 3-Amino-4-chlorophenyl 2'naphthyl disulfimide | 2,5-Dimethoxyaniline | Phenol | Diethyl Sulfate | Scarlet |
| 32. | 2-Aminophenyl methyl disulfimide | 2,5-Dimethoxyaniline | Phenol | Diethyl sulfate | Scarlet |
| 33. | 2-Aminophenyl methyl disulfimide | 2,5-Dimethoxyaniline | 2,6-Dimethylphenol | Diethyl Sulfate | Scarlet |
| 34. | 2-Aminophenyl methyl disulfimide | Cresidine | 2,6-Dimethylphenol | Diethyl sulfate | Orange |
| 35. | 2-Aminophenyl methyl disulfimide | Cresidine | o-Chlorophenol | Diethyl Sulfate | Orange |

I claim:
1. A compound having the structure:

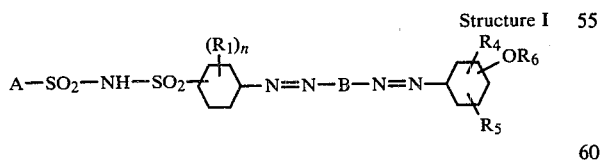

Structure I wherein
n is 1 or 2
A represents phenyl, tolyl, halophenyl, naphthyl or an alkyl having from 1 to 4 carbon atoms.
$R_1$ represents H, halogen, —O-lower alkyl having from 1 to 4 carbon atoms or alkyl having from 1 to 4 carbon atoms;
B represents $R_2$ represents H, lower alkyl having from 1 to 4 carbon atoms or —O-lower alkyl having from 1 to 4 carbon atoms;
$R_3$ represents H, lower alkyl having from 1 to 4 carbon atoms or —O-lower alkyl having from 1 to 4 carbon atoms;
$R_4$ represents H, lower alkyl having from 1 to 4 carbon atoms, —O-lower alkyl having from 1 to 4 carbon atoms, —Br, —F, or —Cl;
$R_5$ represents H, lower alkyl having from 1 to 4 carbon atoms, or —O-lower alkyl having from 1 to 4 carbon atoms; and
$R_6$ represents —$CH_3$ or —$CH_2CH_3$.

2. Disazo dyestuff, which in the form of the free acid, has the formula

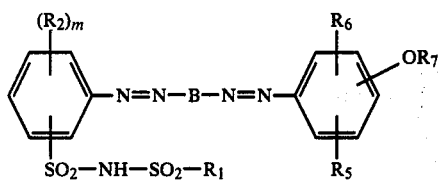

B is 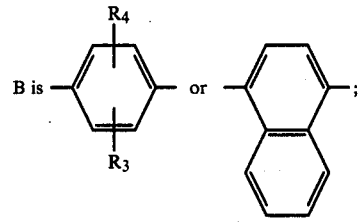

$R_1$ is phenyl, phenyl substituted by methyl or halogen or $C_1$-$C_4$-alkyl;

$R_2$ is H, halogen, o-lower alkyl having 1 to 4 carbon atoms or alkyl having 1 to 4 carbon atoms;

$R_3$ is hydrogen, lower alkyl having 1 to 4 carbon atoms or —O-lower alkoxy having 1 to 4 carbon atoms;

$R_4$ is hydrogen, lower alkyl having 1 to 4 carbon atoms, or —O-lower alkoxy having 1 to 4 carbon atoms;

$R_5$ and $R_6$ independently of one another are hydrogen, $C_1$-$C_4$-alkyl or $C_1$-$C_4$-alkoxy,;

$R_5$ is additionally —Br, —F or —Cl;

$R_7$ is —$CH_3$ or —$CH_2CH_3$; and m is 1 or 2.

3. Disazo dyestuff of claim 2 in which B is 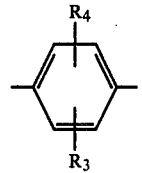

4. Disazo dyestuff of claim 2 in which B is 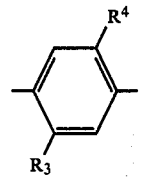

5. Disazo dyestuff of claim 2 in which B is 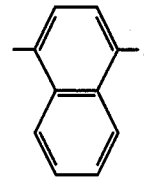

6. Disazo dyestuff of claim 5 in which $R_7$ is methyl or ethyl.

7. Disazo dyestuff of claim 2 in which $R_1$ is phenyl, phenyl substituted by methyl, or $C_1$-$C_4$-alkyl.

8. The sodium, potassium or ammonium salt of a compound according to claim 1.

9. A compound according to claim 1 having the structure:

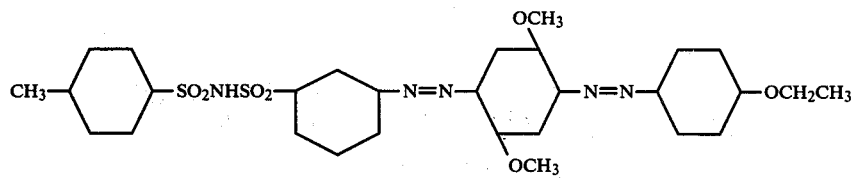

10. A compound according to claim 1 having the structure:

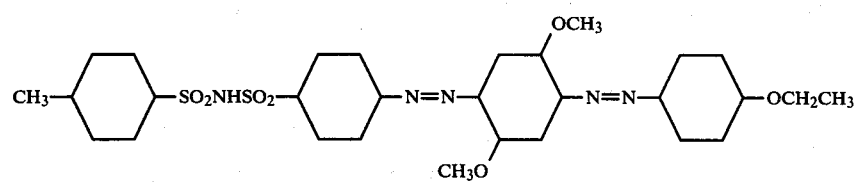

11. The compound according to claim 1 having thestructure:

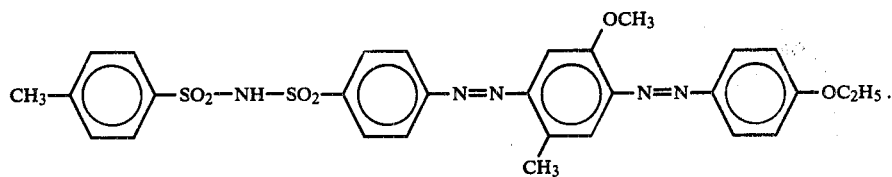

12. The compound according to claim 1 having the structure:

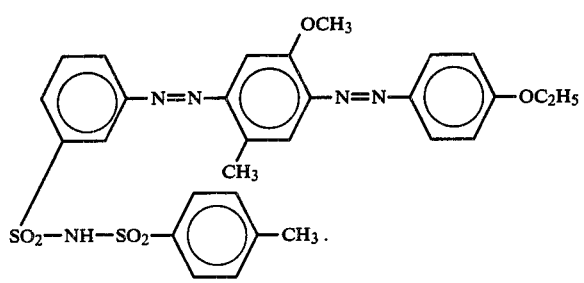

13. The compound of claim 1 having the structure:

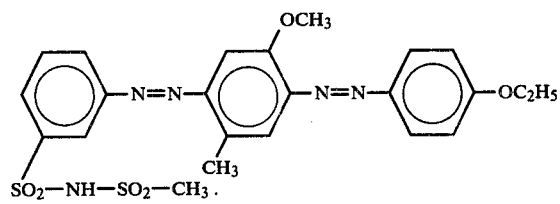

14. The compound according to claim 1 having the structure:

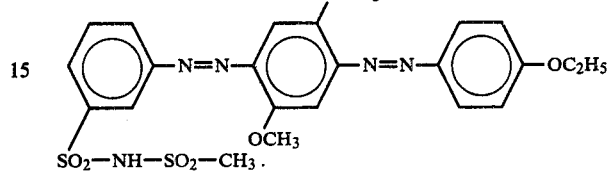

15. The compound according to claim 1 having the structure:

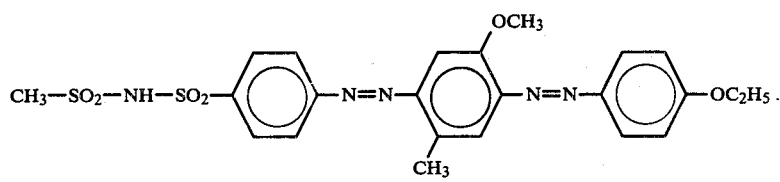

16. The compound according to claim 1 having the structure:

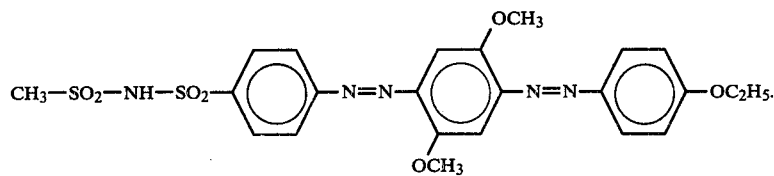

17. The compound according to claim 1 having the structure:

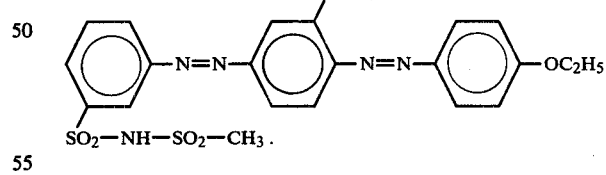

18. The compound according to claim 1 having the structure:

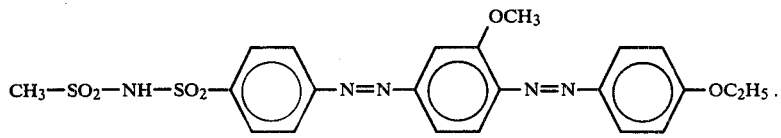

19. The compound according to claim 1 having the structure:

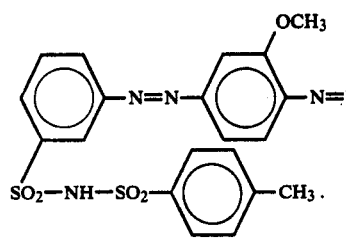
20. The compound according to claim 1 having the structure:
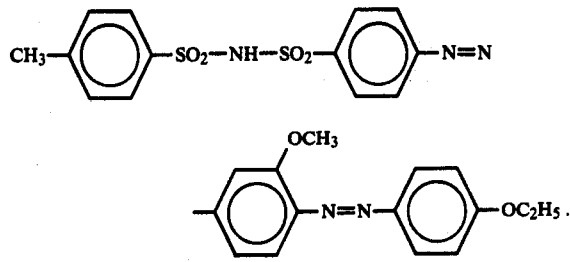

UNITED STATES PATENT AND TRADEMARK OFFICE
CERTIFICATE OF CORRECTION

PATENT NO. : 4,166,059
DATED : August 28, 1979
INVENTOR(S) : James F. Feeman

It is certified that error appears in the above-identified patent and that said Letters Patent are hereby corrected as shown below:

In the Abstract, in the recitation defining $R_4$, change "alkyl having" to --alkyl,--

In column 6, line 45, in the structural diagram, change "N-N-" to -- N=N- --

In Claim 11, change "thes-tructure" to -- the structure --

In column 3, line 4, change "2,5" to -- 2,6 --

In column 3, line 13, change "N-methane" to -- $\underline{N}$-methane --

In column 5, line 42, change "ph" to -- pH --

In the Table, column entitled "Second Component" on the Example numbered 28, change "2,5-Dimethoxyvaniline" to -- 2,5-Dimethoxyaniline --

In the Table, column entitled "End Component" on the Example numbered 18, change "Phenpl" to -- Phenol --

In column 11, line 46, change "of" to -- according to --

Signed and Sealed this

Twentieth Day of November 1979

[SEAL]

Attest:

RUTH C. MASON
Attesting Officer

LUTRELLE F. PARKER
Acting Commissioner of Patents and Trademarks